United States Patent [19]

Gardner

[11] Patent Number: 4,532,296

[45] Date of Patent: Jul. 30, 1985

[54] PROCESS FOR PRODUCING LOW VISCOSITY CURABLE POLYESTER RESIN COMPOSITIONS

[75] Inventor: Hugh C. Gardner, Somerville, N.J.

[73] Assignee: Union Carbide Corporation, Danbury, Conn.

[21] Appl. No.: 626,145

[22] Filed: Jun. 29, 1984

[51] Int. Cl.$^3$ .................... C08G 63/76; C08L 67/00
[52] U.S. Cl. .................... 525/48; 525/20; 525/23; 525/43; 525/49; 528/274; 528/295.3; 528/306; 528/485; 528/487; 528/488; 528/492; 528/298
[58] Field of Search ............ 525/20, 23, 43, 48, 525/49; 528/274, 295.3, 306, 485, 487, 488, 492, 298

[56] References Cited

U.S. PATENT DOCUMENTS

| | | | |
|---|---|---|---|
| Re. 29,555 | 2/1978 | Canning et al. | 260/22 CB |
| 2,671,070 | 3/1954 | Knapp | 260/45.4 |
| 3,166,434 | 1/1965 | Gauger, Jr. | 117/57 |
| 3,188,303 | 6/1965 | Dissen | 260/78.4 |
| 3,340,327 | 9/1967 | Spellberg et al. | 260/861 |
| 3,883,612 | 5/1975 | Pratt et al. | 260/862 |
| 3,933,757 | 1/1976 | Pratt et al. | 260/75 A |
| 3,957,736 | 5/1976 | Tsuchiya et al. | 526/11.1 |
| 3,986,992 | 10/1976 | Canning et al. | 260/22 CB |
| 4,029,848 | 6/1977 | Nelson | 428/430 |
| 4,035,439 | 7/1977 | Stevenson | 260/859 R |
| 4,100,120 | 7/1978 | Maekawa et al. | 260/22 CB |
| 4,148,765 | 4/1979 | Nelson | 260/22 CB |
| 4,224,430 | 9/1980 | Maekawa et al. | 526/282 |
| 4,228,251 | 10/1980 | Maekawa et al. | 525/49 X |
| 4,233,413 | 11/1980 | Monma et al. | 525/168 |
| 4,233,432 | 11/1980 | Curtis, Jr. | 528/298 |
| 4,246,367 | 1/1981 | Curtis | 525/49 |
| 4,299,950 | 11/1981 | Iwata et al. | 528/306 |
| 4,309,519 | 1/1982 | Obara et al. | 528/306 X |
| 4,348,499 | 9/1982 | Nelson | 525/49 |
| 4,360,634 | 11/1982 | Nelson | 525/36 |
| 4,435,530 | 3/1984 | Hefner | 525/48 X |

OTHER PUBLICATIONS

D. L. Nelson, Considerations: Dicyclopentadiene in Polyester Resins, 36th Annual Conference, Reinforced Plastics/Composites Institute, The Society of the Plastics Industry, Inc., Feb. 16–20, 1981, Session 7-E, pp. 1–7.

*Primary Examiner*—Lucille M. Phynes
*Attorney, Agent, or Firm*—Steven T. Trinker

[57] ABSTRACT

This invention relates to a process for producing low viscosity curable polyester resin compositions, which compositions contain a mixture of (i) an unsaturated ester terminally modified with a reactive olefin such as dicyclopentadiene or other Diels-Alder adducts of cyclopentadiene with an olefinic or acetylenic hydrocarbon or alkylated derivative thereof and (ii) a polymerizable ethylenically unsaturated monomer which serves to crosslink the unsaturated ester to a thermoset product. Fiber reinforced thermoset articles can be produced from these curable polyester resin compositions.

20 Claims, No Drawings

PROCESS FOR PRODUCING LOW VISCOSITY CURABLE POLYESTER RESIN COMPOSITIONS

BRIEF SUMMARY OF THE INVENTION

1. Technical Field

This invention relates to a process for producing low viscosity curable polyester resin compositions, which compositions contain a mixture of (i) an unsaturated ester terminally modified with a reactive olefin such as dicyclopentadiene or other Diels-Alder adducts of cyclopentadiene with an olefinic or acetylenic hydrocarbon or alkylated derivative thereof and (ii) a copolymerizable ethylenically unsaturated monomer which serves to crosslink the unsaturated ester to a thermoset product. Fiber reinforced thermoset resin articles can be produced from these curable polyester resin compositions.

2. Background of the Invention

Unsaturated polyester resins are typically used as the resin component in the manufacture of fiber reinforced thermoset plastics. The resins generally consist of unsaturated polyesters dissolved in a polymerizable ethylenically unsaturated monomer such as styrene. Typically, these unsaturated polyesters are formed by reacting an unsaturated diacid or anhydride with a nearly equivalent amount of dihydric alcohol at temperatures above about 200° C. for several hours. Maleic anhydride is the most common acid component utilized. The dihydric alcohols which are commonly used include ethylene glycol, 1,2-propylene glycol, dipropylene glycol, diethylene glycol, and the like. Modifying amounts of other diacids, such as phthalic acid, isophthalic acid, terephthalic acid, or adipic acid are also commonly used. Phthalic anhydride is also often used. Unsaturation which is provided by maleate or fumarate groups within the backbone of the polyester takes part in the crosslinking or curing, of unsaturated polyester resins. These unsaturated polyester resins are considered among the least expensive resins suitable for the manufacture of a variety of fiber reinforced products.

Much effort has recently been directed toward the development of alternative resin systems with potentially improved economics. To be a viable alternative, such resin systems should exhibit the highly desirable properties of conventional unsaturated polyester resins and provide fiber reinforced thermoset articles having excellent mechanical properties. Modification of unsaturated polyesters with olefins such as dicyclopentadiene has been investigated as one method for reducing the cost of unsaturated polyester resin systems.

Investigators have found that incorporation of dicyclopentadiene results in two structurally different types of polyesters. See, for example, D. L. Nelson, Considerations: Dicyclopentadiene in Polyester Resins, 36th Annual Conference, Reinforced Plastics/Composites Institute, The Society of the Plastics Industry, Inc., Feb. 16-20, 1981, Session 7-E, pages 1-7. One polyester type contains ester and/or ether groups resulting from carboxyl or hydroxyl addition to one of the dicyclopentadiene double bonds. Such ester and/or ether addition groups have the formula

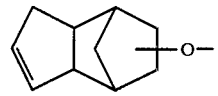

The other polyester type contains Diels-Alder reaction groups resulting from dimer cracking and subsequent reaction of cyclopentadiene with a dieneophile such as maleic acid. Such Diels-Alder groups have the formula

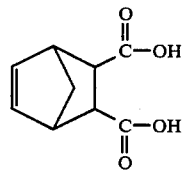

when maleic acid is the dieneophile. Combinations of the above groups may also be incorporated in polyesters.

U.S. Pat. Nos. 3,883,612, 3,933,757, 3,986,992, 4,035,439 and Re. 29,555, all assigned to SCM Corporation, disclose thickened, low shrink molding compositions containing a dicyclopentadiene-modified polyester polymer obtained by the following steps: (1) reacting a glycol, e.g., propylene glycol, and an unsaturated dibasic acid, e.g., maleic acid, at a temperature of about 150° C. to yield an acid terminated partial copolymer; (2) reacting dicyclopentadiene with the partial copolymer prepared in step (1) at a temperature of about 150° C. to yield a prepolymer; (3) reacting additional glycol with the prepolymer of (2) at a temperature of about 200° C. to yield a dicyclopentadiene polyester polymer; and (4) adding styrene to the dicyclopentadiene polyester polymer. Sheet molding compounds (SMC) and bulk molding compounds (BMC) were prepared from certain of the molding compositions.

U.S. Pat. Nos. 4,233,432 and 4,246,367, both assigned to United States Steel Corporation, disclose dicyclopentadiene modified polyester resins and a method for preparation thereof. The resins are prepared by reacting maleic anhydride and water with dicyclopentadiene at a temperature of about 90° C. to 150° C. to give a maleic half ester of dicyclopentyl alcohol, and thereafter reacting a glycol, e.g., propylene glycol, at a temperature of about 210° C. to form the resultant unsaturated polyester.

U.S. Pat. No. 4,233,413, assigned to Hitachi Chemical Company, Ltd., discloses low shrink resin compositions containing an unsaturated polyester obtained by reacting dicyclopentadiene with an alpha, beta-unsaturated dibasic acid, e.g., maleic acid, or reacting dicyclopentadiene with an alpha, beta-unsaturated dibasic acid anhydride, e.g., maleic anhydride and water at 150° C. or lower to yield a partially esterified dicyclopentadiene carboxylic acid, which is further reacted with at least one polyhydric alcohol such as a glycol, e.g., propylene glycol, at a temperature of from 150° C.–210° C. This patent discloses cast articles prepared from the resin compositions.

U.S. Pat. No. 4,224,430, assigned to Hitachi Chemical Company, Ltd., discloses high solids resin compositions containing one or more oligomers prepared by reacting dicyclopentadiene with an alpha, beta-unsaturated hydrocarbon, e.g., maleic acid or maleic anhydride, at a temperature of from 100° C.–140° C. to yield a monobasic acid, which is further reacted with a polyhydric alcohol, e.g., diethylene glycol, at a temperature of from 180°–220° C. Cast articles were prepared from the resin compositions.

U.S. Pat. Nos. 4,029,848 and 4,148,765, both assigned to Dow Chemical Company, disclose resin compositions containing an unsaturated polyester obtained by reacting (1) a glycol, e.g., propylene glycol, (2) an olefinically unsaturated dicarboxylic acid or anhydride, e.g., maleic anydride, (3) a saturated dicarboxylic acid or anhydride, e.g., phthalic anhydride, and (4) dicyclopentadiene at a temperature of about 140° C. for a period of time and thereafter at a temperature of about 200° C. for an additional period of time. Glass laminates were prepared from certain of the resin compositions by a hand roller technique.

U.S. Pat. Nos. 3,166,434 and 3,340,327 disclose resin compositions containing an unsaturated polyester obtained by reacting (1) an unsaturated dicarboxylic acid containing a major molar proportion of fumaric acid, (2) a glycol containing a major molar proportion of polyoxyalkylene glycol and (3) dicyclopentadiene at a temperature up to about 215° C. in the absence of a catalyst (see Example 1 in both patents). Diels-Alder reaction products accompany this polyesterification reaction. Coatings were prepared from certain of the resin compositions.

In the above prior art methods, dicyclopentadiene or its reaction product is present in the reaction mixture with an unsaturated diacid or anhydride and a dihydric alcohol at temperatures of from about 150° C. to about 220° C. At these temperatures, both reacted and unreacted dicyclopentadiene become increasingly susceptible to fragmentary side reactions. For example, the remaining double bond in reacted dicyclopentadiene becomes increasingly susceptible to esterification and etherification reactions. Also, the formation of carbic acid can potentially occur at these high reaction temperatures. Any unreacted dicyclopentadiene can readily undergo dimer cracking at temperatures above about 150° C. and thereby provide for the formation of Diels-Alder groups which can be incorporated into the structure of the polyester. Gelation of dicyclopentadiene modified polyesters has occasionally been observed during polyesterification of temperatures of from 150° C. to 220° C., apparently due to side reactions involving the olefin. See, for example, Comparative Examples F and G hereinbelow. Therefore, it would be highly desirable to prepare dicyclopentadiene modified polyesters by a process in which dicyclopentadiene could be selectively reacted with a polyester having terminal fumarate half ester groups at low reaction temperatures.

It has been found as a result of this invention that dicyclopentadiene can be selectively reacted at low reaction temperatures with a polyester having terminal fumarate half ester groups by utilizing a non-oxidizing acid catalyst having a non-nucleophilic anion. Dicyclopentadiene need no longer be exposed to high reaction temperatures utilized in the prior art methods, and therefore dicyclopentadiene is significantly less susceptible to fragmentary side reactions. The dicyclopentadiene modified polyesters of this invention contain predominantly terminal ester groups resulting from selective acid addition to one of the dicyclopentadiene double bonds. The formation of Diels-Alder reaction products is selectively minimized by utilizing dicyclopentadiene at low reaction temperatures.

There appears to be no prior art directed to the addition of dicyclopentadiene at low reaction temperatures to polyesters containing predominantly fumarate half ester terminal groups.

The curable polyester resin compositions of this invention exhibit highly desirable properties, e.g., low viscosity, rapid cure rate, excellent moisture resistance, and the like, and also provide fiber reinforced composites having excellent mechanical properties. The curable resin compositions exhibit faster cure rates than the resin systems of U.S. patent application Ser. No. 626,146, filed on an even date herewith. Cured articles prepared from the curable resin compositions of this invention also exhibit high heat deflection temperatures. These low viscosity resin systems are very suitable for use in reaction injection molding of fiber reinforced thermoset articles. The curable resin compositions can also have utility as coatings, sealants, adhesives and the like.

3. Disclosure of the Invention

This invention relates to a process for preparing curable polyester resin compositions, which process comprises:

(a) contacting a molar excess of an alpha, beta unsaturated dicarboxylic acid or derivative thereof, preferably selected from maleic acid or anhydride and fumaric acid, with an organic polyol for a time and at a temperature sufficient to form a composition comprising a carboxylic acid terminated polyester having the formula:

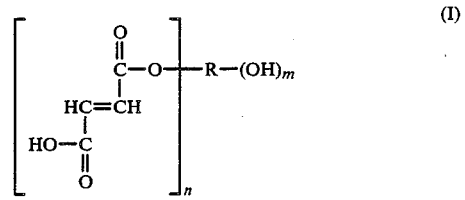

(I)

wherein n is a number having an average value of about 2 to less than about 4, m is a number equal to the free valence of R less the average value of n, the ratio of n to m is greater than about 2.0, preferably at least about 3.0, and R is the residuum of a polyester which contained from 2 to 4 inclusive hydroxyl groups;

(b) contacting a Diels-Alder adduct of cyclopentadiene with an olefinic or acetylenic hydrocarbon or alkylated derivative thereof with the carboxylic acid terminated polyester of (a) in the presence of a non-oxidizing acid catalyst having a non-nucleophilic anion for a long time and at a temperature sufficient to form a composition comprising an unsaturated ester having the formula:

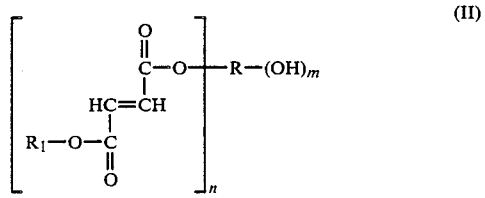

(II)

wherein n, m and R are as defined above and $R_1$ is the residuum of a Diels-Alder adduct of cyclopentadiene with an olefinic or acetylenic hydrocarbon or alkylated derivative thereof having from 2 to about 20 carbon atoms; and (c) admixing a copolymerizable ethylenically unsaturated monomer with the unsaturated ester of (b).

The unfilled curable polyester resin compositions prepared by the process of this invention have a low viscosity, i.e., from about 10 to about 1500 centipoises, preferably less than about 1000 centipoises, and most preferably less than about 600 centipoises, so that they can be used to produce thermoset resin articles containing up to about 75 weight percent of reinforcing fibers by a rapid injection molding process. A low viscosity curable molding composition is highly desirable in a rapid injection molding process in order to avoid any movement of the reinforcing fibers during the injection step. Composite articles can be produced from the curable molding compositions of this invention by a rapid injection molding process which is typically less than three minutes, oftentimes less than two minutes, from the time the cure of the resin mixture is initiated. Other composite fabrication processes such as spray up, wet lay up, resin transfer molding, centrifugal casting and filament winding can also utilize the resin compositions of this invention. The resin compositions can also be used in sheet molding compound (SMC) and bulk molding compound (BMC).

The fiber reinforced thermoset resin articles prepared from the curable molding compositions have utility in many end-use applications such as automobile parts, appliance housings, and the like.

Process step (b) of this invention in which dicyclopentadiene is selectively added to the carboxylic acid terminated polyester is carried out at a temperature below 150° C. Dicyclopentadiene is therefore not exposed to high reaction temperatures. No volatile by-products are formed during this process which is an economically attractive feature. Dicyclopentadiene modified polyesters prepared by the process of this invention have a comparatively narrow molecular weight distributions as determined by conventional analytical techniques such as gel permeation chromatography. The dicyclopentadiene modified polyesters contain predominantly terminal ester groups resulting from selective addition of carboxyl groups to one of the dicyclopentadiene double bonds. The formation of Diels-Alder reaction products such as carbic anhydride or carbic acid is selectively minimized by utilizing dicyclopentadiene at low reaction temperatures. In addition to their utility as matrix resins of fiber reinforced thermoset articles, such resin compositions can have utility as coatings intermediates, sealants, adhesives and the like.

DETAILED DESCRIPTION

The process for preparing the curable polyester resin compositions which are suitable for use in the fabrication of fiber reinforced thermoset articles involves the following general steps:

(1) preparation of a carboxylic acid terminated unsaturated polyester having predominantly terminal fumarate half ester groups by reacting a molar excess of an alpha, beta unsaturated dicarboxylic acid or derivative thereof selected from maleic acid or anhydride and fumaric acid with an organic polyol;

(2) addition of a non-oxidizing acid catalyst having a non-nucleophilic anion;

(3) preparation of an unsaturated ester by selectively reacting a Diels-Alder adduct of cyclopentadiene with an olefinic or acetylenic hydrocarbon or alkylated derivative thereof such as dicyclopentadiene with terminal carboxylic acid groups of the unsaturated polyester of step (1); and (4) Addition of an ethylenically unsaturated monomer such as styrene.

Process step (3) of this invention in which dicyclopentadiene is selectively added to the carboxylic acid terminated polyester is carried out at a temperature below 150° C. Dicyclopentadiene is therefore not exposed to high reaction temperatures. No volatile by-products are formed during this process which is an economically attractive feature. The dicyclopentadiene modified polyesters contain predominantly terminal ester groups resulting from selective carboxyl addition to one of the dicyclopentadiene double bonds. The formation of Diels-Alder reaction products such as carbic anhydride or carbic acid is selectively minimized by utilizing dicyclopentadiene at low reaction temperatures. The curable polyester rein compositions prepared by the process of this invention are particularly suitable for the rapid fabrication of fiber reinforced thermoset articles.

The carboxylic acid terminated unsaturated polyester prepared in step (1) can be characterized by the following empirical formula:

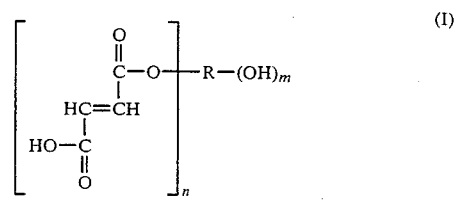

wherein n is a number having an average value of about 2 to less than about 4, m is a number equal to the free valence of R less the average value of n, the ratio of n to m is greater than about 2.0, preferably at least about 3.0, and R is the residuum of a polyester which contained from 2 to 4 inclusive hydroxyl groups. Since low molecular weight polyesters are preferred, a molar excess of alpha, beta unsaturated dicarboxylic acid or derivative thereof is employed in the process. The molar excess is between about 5 and 60 percent, preferably between about 15 and 50 percent.

The temperature utilized in step (1) can range from about 150° C. to about 240° C., preferably from about 170° C. to about 220° C. The reaction time for step (1) can range from about 1 hour or less to about 20 hours or longer. The only requirement is that the alpha, beta ethylenically unsaturated dicarboxylic acid or derivative thereof and the organic polyol react for a time and at a temperature sufficient to form the carboxylic acid terminated unsaturated polyester having predominantly terminal fumarate half ester groups.

The alpha, beta unsaturated dicarboxylic acids or derivatives thereof which can suitably be employed in step (1) above include maleic acid and anhydride and fumaric acid. Modifying amounts of other acids or anhydrides not containing reactive carbon-carbon double bonds such as ortho-phthalic acid and anhydride, isophthalic acid, terephthalic acid, and adipic acid may also be used. A molar excess of alpha, beta unsaturated dicarboxylic acid or anhydride is employed in step (1) to provide a polyester composition having predominantly terminal fumarate half ester groups. Typical polyesters contain at least 75 mole percent of terminal carboxylic acid groups.

The R group in the carboxylic acid terminated unsaturated polyester depicted by empirical formula (I) is derived from a polyester having a number average molecular weight not exceeding 3000 and is obtained by the condensation of a diol with an dicarboxylic acid or anhydride, or mixtures of diols and diacids. Isomerization of the meleate to fumarate configuration occurs simultaneously with polyesterification. The polyester is typically prepared at temperatures of about 200° C. from diols such as 1,2-propylene glycol, ethylene glycol, 1,3-butanediol, 2,2-dimethyl-1,3-propanediol, dipropylene glycol, diethylene glycol, 2,2-dimethyl-3-hydroxypropyl 2,2-dimethyl-3-hydroxypropionate, 1,4-cyclohexane dimethanol, trimethylolpropane, polycaprolactone esters of trimethylolpropane or 1,4-butanediol, 2,2-bis(4-hydroxy-phenyl)propane, the ethylene and propylene oxide adducts of 2,2-bis(4-hydroxypropyl)propane, and mixtures thereof, and a molar excess of dicarboxylic acids or anhydrides, such as maleic acid and anhydride, orthophthalic acid and anhydride, isophthalic acid, terephthalic acid, fumaric acid, carbic acid and anhydride, and mixtures thereof. Preferably at least 80 weight percent of the acid component is an alpha, beta-unsaturated dicarboxylic acid.

Carbic acid is bicyclo[2.2.1]hept-5-ene-2,3-dicarboxylic acid and carbic anhydride is bicyclo[2.2.1]hept-5-ene-2,3-dicarboxylic acid anhydride.

Modifying amounts of trifunctional acids, such as trimellitic acid; linear saturated diacids, such as adipic acid; or triols, such as trimethylol propane may also be used. Typical polyesters have acid numbers of 100 to 300 mg KOH/gm.

The catalyst added to the reaction mixture in step (2) above is a non-oxidizing acid catalyst having a non-nucleophilic anion. This catalyst is essential for effecting the selective addition of a reactive olefin such as dicyclopentadiene or other Diels-Alder adducts of cyclopentadiene with an olefinic or acetylenic hydrocarbon or alkylated derivative thereof to the carboxylic acid terminated unsaturated polyester prepared in step (1) having predominantly terminal fumarate ester groups. A non-oxidizing acid catalyst having a non-nucleophilic anion is defined herein to mean that (1) a 10 percent by weight water solution has a pH of less than 1.0 and (2) the anion portion of the acid does not easily participate in a displacement reaction with organic halides.

Suitable non-oxidizing acid catalysts having a non-nucleophilic anion include fluoroboric acid, trifluomethanesulfonic acid (triflic acid), hexafluorophosphoric acid, hexafluoroantimonic acid, and the like. Supported acid catalysts such as Nafion resins may also be used in this invention. The preferred non-oxidizing acid catalyst having a non-nucleophilic anion is fluoroboric acid. Such catalysts are generally employed in an amount of from about 0.01 weight percent to about 4.0 weight percent, preferably from about 0.05 weight percent to about 2.0 weight percent, based on the total weight of the carboxylic acid terminated unsaturated polyester. These catalysts do not adversely affect cure of the polyester rein systems of this invention.

Acid or acid acting catalytic materials such as sulphuric acid, zinc chloride or p-toluenesulfonic acid are not suitable for effecting the selective, rapid addition of dicyclopentadiene to the carboxylic acid terminated unsaturated polyesters prepared in step (1).

The unsaturated ester prepared in step (3) above can be characterized by the following empirical formula:

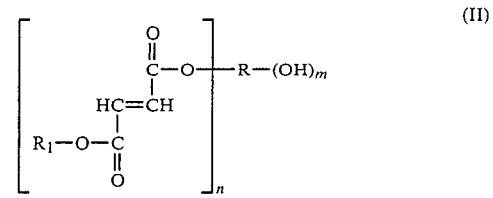

(II)

wherein n, m and R are as defined above and $R_1$ is the residuum of a Diels-Alder adduct of cyclopentadiene with an olefinic or acetylenic hydrocarbon or alkylated derivative thereof having from 2 to about 20 carbon atoms. Suitable olefinic hydrocarbons include ethylene, butadiene, cyclopentadiene, alkylated cyclopentadiene and the like. Suitable acetylenic hydrocarbons include acetylene, 1-hexyne, 2-butyne, 1-butyne, phenylacetylene and the like. $R_1$ is preferably derived from dicyclopentadiene. However, other Diels-Alder adducts of cyclopentadiene such as methyl dicyclopentadiene, norbornene and norbornadiene may also be used to selectively modify the carboxylic acid terminated unsaturated polyester prepared in step (1).

The dicyclopentadiene useful in this invention is a commercial concentrate product generally prepared by dimerizing a crude $C_5$ stream derived from the cracking of crude mixtures of hydrocarbons as set forth in U.S. Pat. No. 3,557,239. Such commercial concentrate products include Dicyclopentadiene 97 commercially available from Exxon Chemical Company, Houston, Tex., and resin grade $C_{10}$ concentrate commercially available from Dow Chemical Company, Midland, Mich.

The commercial dicyclopentadiene concentrates generally contain from about 60 to about 97 percent by weight of dicyclopentadiene, about 5 to 30 weight percent of the mixed Diels-Alder dimers of diolefins such as butadiene, cyclopentadiene, isoprene, cis and trans piperylene and methyl cyclopentadiene. Any remaining amounts in these concentrates generally contain benzene, cyclopentene, 1,5-hexadiene and oligomers of the above diolefins.

The Diels-Alder adducts of cyclopentadiene with an olefinic or acetylenic hydrocarbon or alkylated derivative thereof, e.g., dicyclopentadiene, can be incorporated into the carboxylic acid terminated unsaturated polyester by two methods, i.e., via an addition reaction

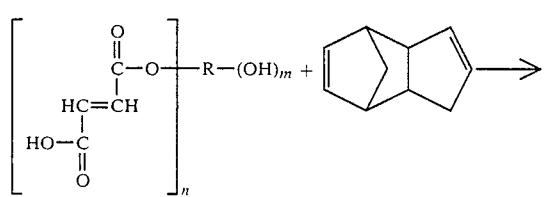

-continued

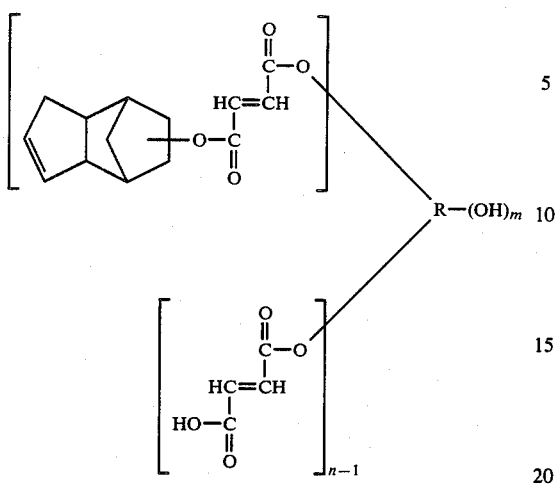

or by a Diels-Alder reaction

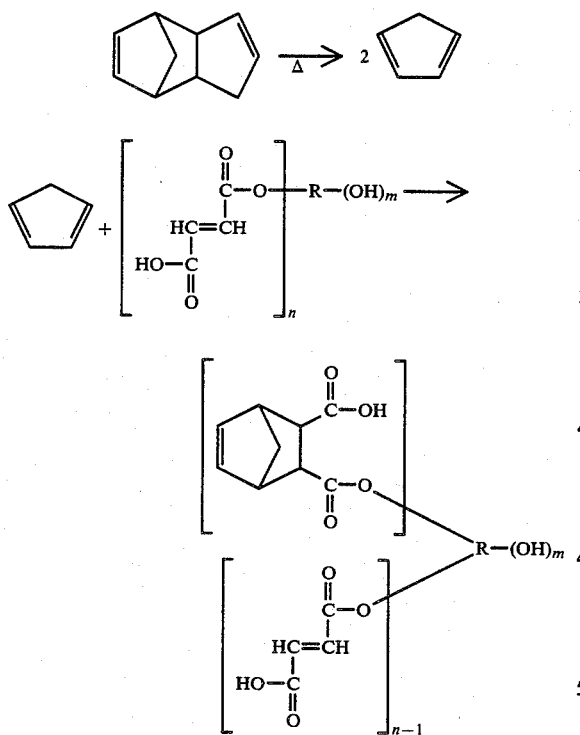

The Diels-Alder reaction may also occur between the internal unsaturation in the polymer chain and cyclopentadiene. The properties of the resin compositions depend critically on how dicyclopentadiene is incorporated. In the process of this invention, conditions are tailored to favor the addition reaction. The formation of Diels-Alder reaction products such as carbic anhydride or carbic acid is selectively minimized by utilizing dicyclopentadiene at the low reaction temperatures employed in the process of this invention. For applications where fast cure is important such as in automotive applications, it is preferable to incorporate dicyclopentadiene via the addition mode. The addition mode is also preferred for improved compatibility of the polyester compositions with ethylenically unsaturated monomers such as styrene and for reduced moisture sensitivity in cured resins prepared therefrom.

The preferred stoichiometry is 0.7 to 1.2 moles of the Diels-Alder adduct of cyclopentadiene with an olefinic or acetylenic hydrocarbon or alkylated derivative thereof, e.g., dicyclopentadiene, per one mole of carboxylic group in the unsaturated polyester prepared in step (1). Since some of the dicyclopentadiene condenses with itself, molar ratios slightly above 1.0 can be employed without difficulty if desired. The unsaturated esters prepared in step (3) have acid numbers of about 70 mg KOH per gram of unsaturated ester or less.

The temperature utilized in the reaction of step (3) can range from about 80° C. to about 140° C., preferably from about 100° C. to about 130° C. Since dicyclopentadiene is thermally unstable above about 150° C., it is necessary to cool the reaction mixture below that temperature prior to the addition thereof. In this manner, the amount of dicyclopentadiene incorporated via the "addition mode" is maximized and very little, if any, Diels-Alder addition takes place. The reaction time for step (3) can vary from about 0.1 hours or less to about 5 hours or longer. The only requirement is that the dicyclopentadiene react with the carboxylic acid terminated unsaturated polyester in the presence of the non-oxidizing acid catalyst having a non-nucleophilic anion for a time and at a temperature sufficient to form the unsaturated ester depicted in empirical formula (II) above. Since the addition of dicyclopentadiene to the fumarate half ester groups of the carboxylic acid terminated unsaturated polyester is an exothermic reaction, it is desirable to add the dicyclopentadiene at such a rate that the reaction temperature remains below about 130° C. An inert solvent may be employed for this step if desired. In the absence of the non-oxidizing acid catalyst having a non-nucleophilic anion in step (2) above, mixtures of carboxylic acid terminated unsaturated polyesters having predominantly terminal fumarate half ester groups and dicyclopentadiene are unreactive at a temperature of 120° C.

Suitable ethylenically unsaturated monomers which can be employed in step (4) above include one or more ethylenically unsaturated copolymerizable monomers which are soluble in and copolymerizable with the unsaturated ester prepared in step (3). Typically, the ethylenically unsaturated monomer is added to the reaction mixture after all of the olefinic compound, e.g., dicyclopentadiene, has reacted in step (3). These ethylenically unsaturated monomers contain at least a single —CH=C< group, and preferably a $CH_2$=C< group and include styrene and its derivatives and homologues, diallyl phthalate, triallyl isocyanurate, nonfunctionalized esters of acrylic or methacrylic acid (such as ethyl acrylate, butyl acrylate, and methyl methacrylate), unsaturated nitriles (such as acrylonitrile and methacrylonitrile) and the like. Also included herein are low levels of maleic anhydride.

Other suitable ethylenically unsaturated monomers include acrylic or methacrylic acid or a functionalized derivative thereof having a molecular weight of less than 300. Mixtures of these may also be used in this invention. The functionalized derivatives are characterized by the presence of acrylate, methacrylate, acrylamide, and methacrylamide groups and also by the presence of functional groups such as hydroxyl, amino, alkylamino, and epoxide, for example. The molecular weight of these monomers is typically less than 300.

Preferred monomers are characterized by the following formula:

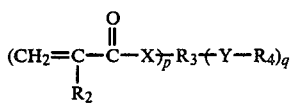

wherein $R_2$ is independently hydrogen or methyl; X and Y are independently —O— or

wherein $R_5$ is hydrogen or lower alkyl; $R_3$ is an aliphatic or aromatic radical containing from 2 to about 10 carbon atoms, optionally containing —O— or

$R_4$ is hydrogen or an aliphatic or aromatic radical containing from 1 to 10 carbon atoms; and p and q are integers of or greater than 1, preferably 1 to 3.

These functionalized derivatives of acrylic or methacrylic acid include 2-hydroxyethyl acrylate, 2-hydroxyethyl methacrylate, hydroxylpropyl acrylate, hydroxypropyl methacrylate, hydroxybutyl acrylate, hydroxybutyl methacrylate, 2-aminoethyl acrylate, 2-aminoethyl methacrylate, 2-methylaminoethyl acrylate, 2-methylaminoethyl methacrylate, 2-dimethylaminoethyl acrylate, 2-dimethylaminoethyl methacrylate, 2-hydroxyethyl acrylamide, 2-hydroxyethyl methacrylamide, 2-aminoethyl acrylamide, 2-aminoethyl methacrylamide, diethylene glycol monoacrylate, diethylene glycol monomethacrylate, 2-methoxyethyl acrylate, 2-methoxyethyl methacrylate, pentaerythritol monoacrylate, pentaerythritol monomethacrylate, pentaerythritol diacrylate, pentaerythritol dimethacrylate, pentaerythritol triacrylate, glycerol monoacrylate, glycerol monomethacrylate, trimethylolpropane monoacrylate, trimethylolpropane monomethacrylate, glycidyl methacrylate, glycidyl acrylate, hydroxymethyl acrylamide and the like or mixtures thereof. It is understood that several isomers of many of these monomers exist and would be suitable for use herein either as individual components or as mixtures with any of the other monomers. Similarly, it is understood that additional derivatives containing aromatic rings and other alkyl groups in the acid or ester portion of the above formula may also be included.

Preferred functionalized derivatives of acrylic or methacrylic acid employed in the practice of this invention include 2-hydroxyethyl methacrylate, 2-hydroxyethyl acrylate, hydroxypropryl acrylate and hydroxypropyl methacrylate.

Mixtures of the aforementioned ethylenically unsaturated monomers may be effectively employed in the practice of this invention.

The preferred ethylenically unsaturated monomer contemplated in the practice of this invention is styrene or a mixture of styrene and 2-hydroxyethyl methacrylate.

The ethylenically unsaturated monomer is present in the curable resin compositions in an amount of from about 10 to about 75 weight percent, preferably from about 25 to about 65 weight percent. The unsaturated ester prepared in step (3) is present in the curable resin compositions in an amount from about 25 to about 90 weight percent, preferably from about 35 to about 75 weight percent.

Although the process for preparing the curable resin compositions produces no volatiles, a small amount of solid precipitate usually forms. This solid amounts to less than about 3 weight percent of the total resin composition weight, and consists primarily of fumaric acid which is a by-product of step (1). The solid can be removed by centrifugation or filtration.

The curable resin compositions may also be treated with a weak base prior to curing. Treatment with a weak base minimizes discoloration caused by high temperatures during cure, especially when hexafluorophosphoric acid or trifluoromethanesulfonic acid (triflic acid) are used as catalysts for the addition of the Diels-Alder adduct of cyclopentadiene with an olefinic or acetylenic hydrocarbon or alkylated derivative thereof, e.g., dicyclopentadiene, to the carboxylic acid terminated unsaturated polyester in step (3). Suitable weak bases include crosslinked polyvinylpyridine, disodium acid phosphate, sodium carbonate, alumina and the like. When using sodium carbonate in the weak base treatment step, a desiccant such as magnesium sulfate is also added to scavenge water generated in the neutralization process. The weak base can be employed in an amount of from about 0.1 weight percent to about 10.0 weight percent, preferably from about 0.2 weight percent to about 5.0 weight percent, based on the total weight of the resin composition. Preferably the weak base is separated from the resin by, for example, filtration before the resin is molded.

It is furthermore desirable to utilize a vinyl polymerization inhibitor in those cases where the curable polyester resin composition is to be stored and/or shipped. Suitable vinyl polymerization inhibitors are hydroquinone, para-benzoquinone, phenothiazine, 4-nitrophenol, t-butyl catechol, quinhydrone, toluhydroquinone, mono-t-butyl hydroquinone, 2,5-di-t-butylhydroquinone, hydroquinone monomethyl ether, the biphenol derivatives described in U.S. Pat. No. 4,158,027, and the like. The amount of inhibitor for the purpose of preventing vinyl polymerization can be that conventionally used, namely, from about 100 to about 1000 ppm of the total weight of the resin composition.

A free radical initiator which initiates curing via the co-reaction of the unsaturated ester and the ethylenically unsaturated monomer can also be included in the curable polyester resin compositions of this invention. These initiators include azo compounds, peroxides, peresters, perketals, and the like including mixtures thereof.

Azo and peroxide initiators are described by, for example, Gallagher et al. "Organic Peroxides Review, Plastics Design and Processing", July 1978, pages 38–42, and August 1978, pages 60–67 inclusive. The technology disclosed in those two articles is incorporated herein by reference. The choice of the specific peroxide or azo initiators or mixtures thereof for the purpose of curing the molding compositions of this invention is within the purview of those having skill in this art and the manner in which such peroxides and azo initiators effect a desirable cure is generally characterized in the aforementioned articles.

Examples of such initiators include 1,1-di-t-butylperoxycyclohexane, 1,1-di-t-butylperoxy-3,3,5-trimethylcyclohexane, 2,2-di-t-butylperoxybutane, 2,2-di-t-butyl-peroxy-4-methyl-pentane, 2,2-dicumylperoxypropane, butyl 2,2-di-t-butylperoxyvalerate, 2,2'-azobisisobutyronitrile, benzoyl peroxide, lauroyl peroxide, di-t-butyl peroxide, t-butyl-perpivalate, 2,5-dimethyl-hexane-2,5-di-perethylhexanoate, t-butyl peroctoate, t-butyl perneodecanoate, t-butyl perbenzoate, t-butyl percrotonate, t-butyl perisobutyrate, di-t-butyl perphthalate, bis(4-t-buty-cyclohexyl)peroxydicarbonate, methyl ethyl ketone peroxide, 2,4-pentanedione peroxide, ethyl 3,3-di(butylperoxy)butyrate, and the like.

The peresters and perketals may be used in combination with an acid cure accelerator as described in Netherlands published Patent Application No. 7604405. These acids include Bronsted acids with a $pK_a$ value lower than or equal to that of formic acid, such as hydrochloric acid, sulfuric acid, nitric acid, phosphoric acid, trichloroacetic acid, p-toluenesulfonic acid, and the like. Also, Lewis acids or metal halides with Lewis acid properties, such as boron trifluoride and the chlorides of iron, cobalt, zinc and aluminum, may be used.

Additionally, the above described initiators may be used in combination with other cure accelerators such as cobalt compounds. These cobalt compounds include cobalt naphthenate, cobalt-amine cure promoters (such as those designated as PEP 183-S and available from Air Products Incorporated), and the like. These cure accelerators operate by decomposing the curing catalysts at a temperature below their normal activation or decomposition temperature.

Mixtures of free radical initiators may be used advantageously herein, such as mixtures of peresters and/or perketals, of perketals and azo compounds, of peresters and axo compounds, or of an azo compound and a peroxide containing compound.

For coating compositions, a preferred initiator package includes methyl ethyl ketone peroxide and cobalt octoate.

Curing can also be effected by photopolymerization of coatings containing the resin compositions of this invention and a photoinitiator. Curing occurs on exposure of such resin compositions to any source of radiation emitting actinic radiation at a wavelength within the ultraviolet and visible spectural regions. Suitable sources of radiation include mercury, xenon, carbon arc and tungsten filament lamps, sunlight, etc. Exposures may be from less than about 1 second to 10 minutes or more depending upon the amounts of particular polymerizable materials and photoinitiators being utilized and depending upon the radiation source and distance from the source and the thickness of the coating to be cured. The compositions may also be polymerized by exposure to electron beam irradiation.

The concentration of the initiator or initiator mixture can be varied within wide limits. As a representative range, the concentration can vary from about 0.25 to about 3.0 weight percent, preferably from about 0.5 to about 2.5 weight percent, and most preferably, from about 0.60 to about 2.0 weight percent, based on the weight of the resin composition.

The curable polyester resin compositions of this invention may also contain one or more of the known types of conventional additives, which are employed for their known purposes in the usual amounts. Illustrative of such additives are mold release agents or lubricants, pigments, fillers such as clay, hydrated alumina, silica, calcium carbonate and others known to the art, thermoplastic polymers, other thermosetting components such as epoxies, viscosity reducing agents, and the like. These additives can be dissolved or dispersed in the curable resin compositions to form a uniform mixture.

The fibers suitable for use in this invention as reinforcing agents have a melting point or a glass transition temperature above about 130° C. These fibers include fiberglass, carbon fibers, aromatic polyamide fibers (such as aramid fibers sold by E. I. duPont de Nemours Company, Wilmington, Del., under the trademark of Kevlar), metal fibers, such as aluminum and steel fibers, boron fibers, and the like. The carbon fibers include those having a high Young's modulus of elasticity and high tensile strength. The carbon fibers may be produced from rayon, polyacrylonitrile or petroleum pitch. Preferred fiber lengths are 1 or more inches. Continuous filaments may also be used. It is also within the scope of this invention to include the use of fiber reinforcements of shorter lengths and also fillers such as milled glass.

The preferred fibers are fiberglass, carbon fibers, aromatic polyamide fibers, and mixtures thereof. The molded article contains from about 10 to about 75 weight percent, preferably from about 15 to about 65 weight percent of the reinforcing fiber.

The curable polyester resin compositions of this invention are prepared by solution blending the unsaturated ester material, the ethylenically unsaturated monomer and any other optional ingredients such as a free-radical curing agent at ambient temperature. Insoluble additives such as calcium carbonate filler can be effectively dispersed in the curable molding compositions. This mixture constitutes the "resin portion" which is a term used herein.

The fiber reinforced molded articles of this invention may be prepared by injecting the resin portion into a bed of one or more of the fibers. After the resin cures, the resulting composite possesses high stiffness and strength.

A preferred process for the rapid fabrication of a fiber reinforced molded article from the curable resin compositions of this invention is described in U.S. patent application Ser. No. 135,906 entitled "Molding Process and Apparatus Therefore," and filed on Apr. 14, 1980 in the name of R. Angell, Jr., which is incorporated herein by reference. In said process, the fiber reinforcement is comprised of one or more fibers with a melting point or a glass transition temperature above about 130° C. The process comprises the steps of (a) providing in a heatable matched metal die mold, a bonded web of one or more of said fibers, (b) providing in an accumulator zone, a liquid body of a thermosettable organic material which is curable upon heating to a thermoset resin composition, the viscosity of said liquid body being maintained essentially constant in the accumulator zone by keeping its temperature below that at which curing of said materials is substantial, (c) closing said mold containing said web, (d) injecting at least a portion of said thermosettable organic material under pressure from said accumulator zone into the mold to thereby fill the cavity in said mold, (e) initiating the curing of said materials by subjecting the materials to a temperature by heating the mold, which is above the temperature at which the curing of said materials is initiated, and (f) opening said mold and removing the cured thermoset article therefrom.

An important aspect of the present invention is that when the curable resin compositions are injected into the interior of the mold, the fibers are not displaced or at most, only slightly displaced from their original position. As a result, the positioning of the fiber reinforcement within the framework of the molded article can therefore be predetermined and maintained in the final molded product. This allows one to achieve a molded product having high and predictable mechanical properties. These properties are determined by the original fiber placement in the mold and are not affected by additional fiber movement when the resin system is injected.

In order to prevent or reduce fiber displacement (i.e., movement and/or orientation) during resin injection, the curable polyester resin compositions of this invention have a viscosity of from about 10 to about 1500 centipoises, preferably less than about 1000 centipoises, and most preferably less than about 600 centipoises. Curable resin compositions having viscosities higher than about 1500 centipoises generally cause substantial fiber movement in the resulting composites. Such composites having non-uniform fiber distribution exhibit poor mechanical properties.

A preferred apparatus for use in preparing fiber reinforced molded articles from curable resin compositions in accordance with this invention is also described in U.S. patent application Ser. No. 135,906, filed Apr. 14, 1980. The apparatus is described as comprising: (a) a heatable matched metal die mold containing one or more cavities therein with means for opening said mold to expose such cavities, and closing the same, and means for controlling the injection of a thermosettable organic liquid to such cavities when the mold is closed, (b) means associated with said mold, whereby one or more fibers in the form of an interlocked mass are provided in a portion of the cavities thereof when the mold is open to expose such cavities and prior to the injection of the thermosettable organic liquid to such cavities when the mold is closed, (c) accumulator means associated with said mold which can contain a thermosettable liquid transportable to means for controlling injection of said liquid to such cavities, and (d) cooling means associated with the means for controlling the injection of such liquid to such cavities, whereby the temperature of the liquid in such injection means is maintained substantially below the temperature of the mold.

Although this invention has been described with respect to a number of details, it is not intended that this invention should be limited thereby. The examples which follow are intended solely to illustrate the embodiments of this invention which to date have been determined and are not intended in any way to limit the scope and intent of this invention.

The resin compositions, non-reinforced castings and cured glass reinforced composites prepared in the examples hereinbelow were evaluated according to the following procedures:

Proton nuclear magnetic spectroscopy was used to determine the relative amounts of maleates, i.e., maleic acid, maleic anhydride, maleate half ester and maleate diester, and the amounts of fumarates, i.e., fumaric acid, fumarate half ester and fumarate diester, in the polyester compositions. In general, a sample was dissolved in $d_6$-dimethyl sulfoxide and the areas for the resonances from the vinylic protons, i.e., —CH=CH—, were compared against each other. The resonance for the vinylic protons in maleic anhydride appeared at approximately $\delta = 7.4$ ppm relative to the protons in tetramethylsilane, the internal standard. Resonances for these protons in fumarates appeared at approximately $\delta = 6.8$ ppm relative to the internal standard, and resonances for these protons in maleates, i.e., maleic acid, maleate half ester and maleate diester, appeared at approximately $\delta = 6.25$ ppm.

Acid Number: A resin sample weighed to the nearest 0.01 gram was added to a flask containing 50 milliliters of a mixture of pyridine and methanol (1:1 volume ratio). The contents in the flask were titrated with 0.5 N aqueous potassium hydroxide using phenolphthalein as an end point indicator. The acid number was calculated as follows:

$$\frac{(A)(N)(56.1)}{\text{grams sample}} = \text{Acid No. (mg KOH/gm sample)}$$

where A is the milliliters of potassium hydroxide titration solution required for the resin sample and N is the normality of the potassium hydroxide solution.

Viscosity: A resin sample was equilibrated at 25° C. and the viscosity was determined using a Brookfield model LVT viscometer.

SPI Gel Time: The cure characteristics of the resin compositions were monitored by the procedure described in A. L. Smith, 6th SPI, Chicago, Ill., 1951, Reinforced Plastics Div., Section 1, page 1.

Flexural Strength: ASTM D-790.
Flexural Modulus: ASTM D-790.
Heat Deflection Temperature: ASTM D-648.
Tensile Strength: ASTM D-638.
Tensile Modulus: ASTM D-638.
Elongation: ASTM D-638.
Barcol Hardness: measured using a Barcol Model 934 Impressor from Barber Coleman Company, Rockford, Ill.

Glass content was determined by ashing.

Unless otherwise indicated, the examples hereinbelow utilized high purity dicyclopentadiene commercially available from Exxon Chemical Company, Houston, Tex. as Dicyclopentadiene 97.

Examples 1 through 7 describe the preparation of the resin compositions of this invention.

EXAMPLE 1

Into a 5 liter four-necked round bottom reaction flask equipped with a nitrogen inlet and outlet, paddle stirrer, electric heating mantle, thermometer with Therm-O-Watch controller and a 12 inch packed distillation column and distillate receiver was added 1569 grams (16.0 moles) of molten maleic anhydride, 457 grams (6.0 moles) of propylene glycol, 637 grams (6.0 moles) of diethylene glycol and 150 milliliters of xylene. The resulting reaction mixture was heated to a temperature of 206° C. with continuous stirring over a 5 hour period. Water was collected in the distillate receiver during this period. The reaction mixture was then maintained at a temperature of from 200° C. to 206° C. for a period of 3.5 hours, and an additional amount of water was collected in the distillate receiver. The reaction mixture was then cooled to a temperature of 155° C., and thereafter subjected to a vacuum of about 27 inches of mercury for a period of one hour to remove any residual water and xylene. A nitrogen blanket was maintained throughout the entire reaction period. Titrimetric analysis indicated that the resulting reaction mixture had an acid number of 165 mg KOH/gram in pyridine/methanol. The high acid number indicated that the reaction mixture consisted predominantly of a carboxyl-terminated unsaturated polyester. NMR spectroscopic analysis revealed that the carbon-carbon double bonds in maleate form (cis) were isomerized to the fumarate form (trans) in the carboxyl-terminated unsaturated polyester during the condensation reaction.

To a 1510 gram portion of the reaction mixture prepared above containing predominantly the carboxyl-terminated unsaturated polyester, which portion had been cooled to a temperature of 120° C., was added 0.8 grams of methylhydroquinone and 3.0 milliliters of fluoroboric acid (a 48 weight percent solution in water). Thereafter, for a period of 75 minutes, 587 grams (4.44 moles) of dicyclopentadiene were added slowly into the reaction flask with continuous rapid stirring at a temperature of from 120° C. to 126° C. The reaction mixture was then maintained at a temperature of 120° C. for a period of one hour with continuous stirring. The extent of the reaction between dicyclopentadiene and the carboxyl-terminated unsaturated polyester was monitored by titration for residual acid, and also by NMR spectroscopy.

Following the one hour heating period, 953 grams of styrene containing 0.8 grams of methylhydroquinone were added into the reaction flask with continuous rapid stirring. The resulting mixture was cooled to ambient temperature and filtered to give a filtrate product and a small amount of a solid by-product. NMR spectroscopic analysis indicated that the solid by-product consisted predominantly of fumaric acid. The filtrate product was a clear brown fluid which weighed 3003 grams. NMR spectroscopic analysis indicated that the product prior to styrene addition consisted predominantly of a dicyclopentadiene-terminated unsaturated polyester.

EXAMPLE 2

Into a 5 liter four-necked round bottom reaction flask equipped with a nitrogen inlet and outlet, paddle stirrer, electric heating mantle, thermometer with Therm-O-Watch controller and a 12 inch packed distillation column and distillate receiver was added 1569 grams (16.0 moles) of molten maleic anhydride, 913 grams (12.0 moles) of propylene glycol and 150 milliliters of xylene, The resulting reaction mixture was heated to a temperature of 190° C. with continuous stirring over a 3 hour period. After 40 minutes into the 3 hour period, the reaction mixture had reached a temperature of 165° C. and the first drop of distillate (water) appeared in the receiver. At the end of the 3 hour period, the reaction mixture had reached a temperature of 190° C. and 72 milliliters of water had been collected in the receiver. The reaction mixture was then maintained at a temperature of from 190° C. to 214° C. for a period of 8 hours. At the end of this 8 hour period, 130 milliliters of water had been collected in the receiver. The reaction mixture was then cooled to a temperature of 150° C., and thereafter subjected to a vacuum of about 27 inches of mercury for a period of 30 minutes to remove any residual water and xylene. A nitrogen blanket was maintained throughout the entire reaction period. Titrimetric analysis indicated that the resulting yellow hazy reaction mixture had an acid number of 207 mg KOH/gram in pyridine/methanol. The high acid number indicated that the reaction mixture consisted predominantly of a carboxyl-terminated unsaturated polyester. NMR spectroscopic analysis revealed that the carbon-carbon double bonds in maleate form (cis) were isomerized to the fumarate form (trans) in the carboxyl-terminated unsaturated polyester during the condensation reaction.

To a 1008 gram portion of the reaction mixture prepared above containing predominantly the carboxyl-terminated unsaturated polyester, which portion had been cooled to a temperature of 120° C., was added 0.3 grams of methylhydroquinone and 2.3 milliliters of fluoroboric acid (a 48 weight percent solution in water). Thereafter, for a period of one hour, 492 grams (3.72 moles) of dicyclopentadiene were added slowly into the reaction flask with continuous rapid stirring at a temperature of from 105° C. to 125° C. The reaction mixture was then maintained at a temperature of 115° C. for a period of one hour with continuous stirring. The extent of the reaction between dicyclopentadiene and the carboxyl-terminated unsaturated polyester was monitored by titration for residual acid, and also by NMR spectroscopy.

Following the one hour heating period, 1000 grams of styrene containing 0.9 grams of methylhydroquinone were added into the reaction flask with continuous rapid stirring. The resulting mixture was cooled to ambient temperature and filtered to give a filtrate product and a small amount of a solid by-product. NMR spectroscopic analysis indicated that the solid by-product consisted predominantly of fumaric acid. The filtrate product was a clear brown fluid. A portion of the filtrate product was diluted with styrene to produce a solution containing 45 weight percent of styrene. The solution had a viscosity of 82 centipoises at 25° C. and an acid number of 10 mg KOH/gram in pyridine/methanol. The low acid number indicated that the filtrate product consisted predominantly of a dicyclopentadiene-terminated unsaturated polyester. NMR spectroscopic analysis indicated that the product prior to styrene addition consisted predominantly of a dicyclopentadiene-terminated unsaturated polyester.

EXAMPLE 3

Into a 3 liter four-necked round bottom reaction flask equipped with a nitrogen inlet and outlet, paddle stirrer, electric heating mantle, thermometer with Therm-O-Watch controller and a 12 inch packed distillation column and distillate receiver was added 588 grams (6.0 moles) of molten maleic anhydride, 248 grams (4.0 moles) of ethylene glycol and 50 milliliters of xylene, The resulting reaction mixture was heated to a temperature of 200° C. with continuous stirring over a 4 hour period. Water was collected in the distillate receiver during this period. The reaction mixture was then maintained at a temperature of 200° C. for a period of 3 hours. At the end of this 3 hour period, about 30 milliliters of water had been collected in the receiver. The reaction mixture was then cooled to a temperature of 150° C., and the appearance thereof changed from a clear yellow solution to a cream-colored fluid. A nitrogen blanket was maintained throughout the entire reaction period. Titrimetric analysis indicated that the cream-colored reaction mixture had an acid number of 249 mg KOH/gram in pyridine/methanol. The high acid number indicated that the reaction mixture consisted predominantly of a carboxyl-terminated unsaturated polyester. NMR spectroscopic analysis revealed that the carbon-carbon double bonds in maleate form (cis) were isomerized to the fumarate form (trans) in the carboxyl-terminated unsaturated polyester during the condensation reaction.

After the reaction mixture prepared above containing predominantly the carboxyl-terminated unsaturated polyester was cooled to a temperature of 120° C., 2.3 milliliters of fluoroboric acid (a 48 weight percent solution in water) was added. Thereafter, for a period of 1 hour, 489 grams (3.70 moles) of dicyclopentadiene were added slowly into the reaction flask with continuous rapid stirring at a temperature of from 105° C. to 125° C. The reaction mixture was then maintained at a temperature of 120° C. for a period of 40 minutes with continuous stirring, and thereafter subjected to a vacuum of 27 inches of mercury for a period of 10 minutes. After the vacuum period, the reaction mixture was maintained at a temperature of 120° C. for an additional 10 minute period with continuous stirring. The extent of the reaction between dicyclopentadiene and the carboxyl-terminated unsaturated polyester was monitored by titration for residual acid, and also by NMR spectroscopy.

Following the 10 minute heating period, 846 grams of styrene containing 0.6 grams of methylhydroquinone were added into the reaction flask with continuous rapid stirring. The resulting mixture was a clear brown solution containing a small amount of a solid by-product. This mixture was stirred with 10 grams of Na$_2$CO$_3$ and 10 grams of MgSO$_4$ for a period of one hour. The resulting reaction mixture was then cooled to ambient temperature and centrifuged to separate the supernatant liquid product from the solids. NMR spectroscopic analysis indicated that the solid by-product consisted predominantly of fumaric acid. The supernatant liquid product was a clear brown fluid with a viscosity of 78 centipoises at 25° C. and having an acid number of 18 mg KOH/gram in pyridine/methanol. The low acid number indicated that the filtrate product consisted predominantly of the dicyclopentadiene-terminated unsaturated polyester. NMR spectroscopic analysis indicated that the product prior to styrene addition consisted predominantly of a dicyclopentadiene-terminated unsaturated polyester.

EXAMPLES 4 and 5

Into a 3 liter four-necked round bottom reaction flask equipped with a nitrogen inlet and outlet, paddle stirrer, electric heating mantle, thermometer with Therm-O-Watch controller and a 12 inch packed distillation column and distillate receiver was added 980 grams (10.0 moles) of molten maleic anhydride, 414 grams (6.67 moles) of ethylene glycol and 100 milliliters of xylene. The resulting reaction mixture was heated to a temperature of 210° C. with continuous stirring over a 6 hour period. At the end of the 6 hour period, 61 milliliters of water had been collected in the receiver. The reaction mixture was then maintained at a temperature of from 190° C. to 210° C. for a period of 4.5 hours. The reaction mixture was then cooled to a temperature of 150° C., and thereafter subjected to a vacuum of about 27 inches of mercury for a period of 40 minutes to remove any residual water and xylene. A nitrogen blanket was maintained throughout the entire reaction period. As the reaction mixture was further cooled to ambient temperature, it formed a brittle solid. Titrimetric analysis indicated that the resulting reaction mixture had an acid number of 220 mg KOH/gram in pyridine/methanol. The high acid number indicated that the reaction mixture consisted predominantly of a carboxyl-terminated unsaturated polyester. NMR spectroscopic analysis revealed that the carbon-carbon double bonds in maleate form (cis) were isomerized to the fumarate form (trans) in the carboxyl-terminated unsaturated polyester during the condensation reaction.

To a 100 gram portion of the reaction mixture prepared above containing predominantly the carboxyl-terminated unsaturated polyester, which portion had been cooled to a temperature of 120° C., was added 0.03 grams of methylhydroquinone and 0.5 milliliters of fluoroboric acid (a 48 weight percent solution in water). Thereafter, for a period of about 0.3 hours, an amount of dicyclopentadiene specified for each example in Table A was added slowly into the reaction flask with continuous rapid stirring at a temperature of from 105° C. to 118° C. The reaction mixture was then maintained at a temperature of 115° C. for a period of one hour with continuous stirring. The extent of the reaction between dicyclopentadiene and the carboxyl-terminated unsaturated polyester was monitored by titration for residual acid, and also by NMR spectroscopy.

Following the one hour heating period, an amount of styrene specified for each example in Table A containing 0.05 grams of methylhydroquinone was added into the reaction flask with continuous rapid stirring. The resulting mixture was cooled to ambient temperature and filtered to give a filtrate product and a small amount of a solid by-product. NMR spectroscopic analysis indicated that the solid by-product consisted predominantly of fumaric acid. The filtrate product was a clear brown fluid having a viscosity and an acid number specified for each example in Table A. The low acid numbers indicated that the filtrate product for each example consisted predominantly of the dicyclopentadiene-terminated unsaturated polyester. NMR spectroscopic analysis indicated that the product for each example prior to styrene addition consisted predominantly of the dicyclopentadiene-terminated unsaturated polyester.

TABLE A

|  | Example | |
|---|---|---|
|  | 4 | 5 |
| Dicyclopentadiene Added (gms.) | 51.8 | 57.0 |
| Styrene Added (gms.) | 101.2 | 104.6 |
| Carboxyl-Terminated Unsaturated Polyester/Dicyclopentadiene (mole ratio)[a] | 1/1.00 | 1/1.10 |
| Acid Number (mg KOH/gm) | 43 | 27 |

[a]Based on acid number determination.

EXAMPLE 6

Into a 5 liter four-necked round bottom reaction flask equipped with a nitrogen inlet and outlet, paddle stirrer, electric heating mantle, thermometer with Therm-O-Watch controller and a 12 inch packed distillation column and distillate receiver was added 1569 grams (16.0 moles) of molten maleic anhydride, 913 grams (12.0 moles) of propylene glycol and 150 milliliters of xylene. The resulting reaction mixture was heated to a temperature of 190° C. with continuous stirring over a 3 hour period. After 40 minutes into the 3 hour period, the reaction mixture had reached a temperature of 165° C. and the first drop of distillate (water) appeared in the receiver. At the end of the 3 hour period, the reaction mixture had reached a temperature of 190° C. and 72 milliliters of water had been collected in the receiver. The reaction mixture was then maintained at a temperature of from 190° C. to 214° C. for a period of 8 hours. At the end of this 8 hour period, 130 milliliters of water had been collected in the receiver. The reaction mixture was then cooled to a temperature of 150° C., and thereafter subjected to a vacuum of about 27 inches of mercury for a period of 30 minutes to remove any residual water and xylene. A nitrogen blanket was maintained throughout the entire reaction period. Titrimetric analysis indicated that the resulting yellow hazy reaction mixture had an acid number of 207 mg KOH/gram in pyridine/methanol. The high acid number indicated that the reaction mixture consisted predominantly of a carboxyl-terminated unsaturated polyester. NMR spectroscopic analysis revealed that the carbon-carbon double bonds in maleate form (cis) were isomerized to the fumarate form (trans) in the carboxyl-terminated unsaturated polyester during the condensation reaction.

To a 200 gram portion of the reaction mixture prepared above containing predominantly the carboxyl-terminated unsaturated polyester, which portion had been cooled to a temperature of 115° C., was added 0.089 grams of methylhydroquinone and 0.6 milliliters of fluoroboric acid (a 48 weight percent solution in water). Thereafter, for a period of 20 minutes, 97.5 grams (0.74 moles) of resin grade dicyclopentadiene commercially available from Dow Chemical Company, Midland, Mich., as XAS 1348, were added slowly into the reaction flask with continuous rapid stirring at a temperature of from 115° C. to 123° C. The reaction mixture was then maintained at a temperature of 115° C. for a period of 45 minutes with continuous stirring, and thereafter subjected to a vacuum of about 27 inches of mercury for a period of 20 minutes. The extent of the reaction between dicyclopentadiene and the carboxyl-terminated unsaturated polyester was monitored by titration for residual acid, and also by NMR spectroscopy.

Following the 20 minute vacuum period, 241 grams of styrene containing 0.09 grams of methylhydroquinone were added into the reaction flask with continuous rapid stirring. The resulting mixture was cooled to ambient temperature and filtered to give a filtrate product and a small amount of a solid by-product. NMR spectroscopic analysis indicated that the solid by-product consisted predominantly of fumaric acid. The filtrate product was a clear brown fluid with a viscosity of 52 centipoises at 25° C. and an acid number of 40 mg KOH/gram in pyridine/methanol. The low acid number indicated that the filtrate product consisted predominantly of the dicyclopentadiene-terminated unsaturated polyester. NMR spectroscopic analysis indicated that the product prior to styrene addition consisted predominantly of a dicyclopentadiene-terminated unsaturated polyester.

EXAMPLE 7

Into a 5 liter four-necked round bottom reaction flask equipped with a nitrogen inlet and outlet, paddle stirrer, electric heating mantle, thermometer with Therm-O-Watch controller and a 12 inch packed distillation column and distillate receiver was added 1569 grams (16.0 moles) of molten maleic anhydride, 913 grams (12.0 moles) of propylene glycol and 150 milliliters of xylene. The resulting reaction mixture was heated to a temperature of 190° C. with continuous stirring over a 3 hour period. After 40 minutes into the 3 hour period, the reaction mixture had reached a temperature of 165° C. and the first drop of distillate (water) appeared in the receiver. At the end of the 3 hour period, the reaction mixture had reached a temperature of 190° C. and 72 milliliters of water had been collected in the receiver. The reaction mixture was then maintained at a temperature of from 190° C. to 214° C. for a period of 8 hours. At the end of this 8 hour period, 130 milliliters of water had been collected in the receiver. The reaction mixture was then cooled to a temperaure of 150° C., and thereafter subjected to a vacuum of about 27 inches of mercury for a period of 30 minutes to remove any residual water and xylene. A nitrogen blanket was maintained throughout the entire reaction period. Titrimetric analysis indicated that the resulting yellow hazy reaction mixture had an acid number of 207 mg KOH/gram in pyridine/methanol. The high acid number indicated that the reaction mixture consisted predominantly of a carboxyl-terminated unsaturated polyester. NMR spectroscopic analysis revealed that the carbon-carbon double bonds in maleate form (cis) were isomerized to the fumarate form (trans) in the carboxyl-terminated unsaturated polyester during the condensation period.

To a 200 gram portion of the reaction mixture prepared above containing predominantly the carboxyl-terminated unsaturated polyester, which portion had been cooled to a temperature of 115° C., was added 0.09 grams of methylhydroquinone and 10 milliliters of 2-hydroxyethyl methacrylate. After a period of 10 minutes, 0.6 milliliters of fluoroboric acid (a 48 weight percent solution in water) were added into the reaction flask. Thereafter, for a period of 20 minutes, 97.5 grams (0.74 moles) of dicyclopentadiene were added slowly into the reaction flask with continuous rapid stirring at a temperature of from 105° C. to 125° C. The reaction mixture was then maintained at a temperature of 115° C. for a period of 75 minutes with continuous stirring. The extent of the reaction between dicyclopentadiene and the carboxyl-terminated unsaturated polyester was monitored by titration for residual acid, and also by NMR spectroscopy.

Following the 75 minute heating period, 99.9 grams of styrene containing 0.09 grams of methylhydroquinone were added into the reaction flask with continuous rapid stirring. The resulting mixture was cooled to ambient temperature and filtered to give a filtrate product and a small amount of a solid by-product. NMR spectroscopic analysis indicated that the solid by-product consisted predominantly of fumaric acid. The filtrate product was a clear brown fluid with a viscosity of 2260 centipoises at 25° C. NMR spectroscopic analysis indicated that the product prior to styrene addition consisted predominantly of a dicyclopentadiene-terminated unsaturated polyester.

Comparative Example A describes the attempted preparation of a dicyclopentadiene-terminated unsaturated polyester without the addition of a special acid catalyst.

COMPARATIVE EXAMPLE A

Into a 5 liter four-necked round bottom reaction flask equipped with a nitrogen inlet and outlet, paddle stirrer, electric heating mantle, thermometer with Therm-O-Watch controller and a 12 inch packed distillation column and distillate receiver was added a 100 gram portion of the reaction mixture prepared in Example 7 above containing predominantly the carboxyl-terminated unsaturated polyester, which portion had been cooled to a temperature of 120° C., and 0.05 grams of methylhydroquinone. Thereafter, for a period of 0.3 hours, 48.7 grams (0.37 moles) of dicyclopentadiene were added slowly into the reaction flask with continuous rapid stirring at a temperature of from 105° C. to 125° C. The reaction mixture was then maintained at a temperature of 120° C. for a period of 5.5 hours with continuous stirring. The extent of the reaction between dicyclopentadiene and the carboxyl-terminated unsaturated unsaturated polyester was monitored by titration for residual acid, and also by NMR spectroscopy. After 3.3 hours into the 5.5 hour heating period, the reaction mixture was determined to have an acid number of 130 mg KOH/gm in pyridine/methanol. At the end of the 5.5 hour heating period, the reaction mixture was determined to have an acid number of 129 mg KOH/gm in pyridine/methanol.

Following the 5.5 hour heating period, 99 grams of styrene containing 0.025 grams of methylhydroquinone were added into the reaction flask with continuous rapid stirring. The resulting mixture was cooled to ambient temperature and allowed to stand overnight. Upon observation the next day, the reaction mixture consisted of two liquid layers and a solid precipitate. The top layer was primarily unreacted dicyclopentadiene and styrene, and the bottom layer was primarily the unreacted carboxyl-terminated unsaturated polyester. This reaction mixture was not suitable for use as a molding resin.

Examples 8 through 11 and Comparative Examples B through E show the effect of choice of catalyst and amount thereof on the reaction of a fumarate half ester, i.e., ethyl hydrogen fumarate, with dicyclopentadiene.

EXAMPLES 8 THROUGH 11 AND COMPARATIVE EXAMPLES B THROUGH E

Into a 25 mm×200 mm test tube having a magnetic stirring bar and sealed with a serum cap was added 10.0 grams (0.069 moles) of ethyl hydrogen fumarate commercially available from the Aldrich Chemical Company, Milwaukee, Wis., and 9.16 grams (0.069 moles) of high purity dicyclopentadiene. After heating the reaction mixture to a temperature of 120° C. with continuous stirring, an amount of a catalyst specified for each example in Table B was added into the test tube. The resulting reaction mixture was maintained at a temperature of 120° C. for a period of time specified for each example in Table B with continuous stirring. Samples were removed at time periods specified for each example in Table B and analyzed to determine the acid number thereof. The acid number is indicative of the extent of the reaction between ethyl hydrogen fumarate and dicyclopentadiene. The extent of the reaction is shown in Table B as the percent decrease in acid number based on the acid number of Comparative Example A. Although equimolar amounts of the ethyl hydrogen fumarate and dicyclopentadiene were used, the acidity did not reach zero when all of the dicyclopentadiene had reacted since side reactions consumed a portion of the dicyclopentadiene.

TABLE B

| Example/Comparative Example | Catalyst (wt. %) | Time (hr.) | Acid Number (mg KOH/gm) | % Decrease in Acid Number |
|---|---|---|---|---|
| 8 | Fluoroboric Acid[a] (0.5) | 1.0 | 44 | 79 |
| | | 3.0 | 44 | 79 |
| 9 | Fluoroboric Acid[a] (0.1) | 1.0 | 161 | 23 |
| | | 5.0 | 74 | 64 |
| 10 | HPF$_6$[b] (0.5) | 1.0 | 92 | 56 |
| | | 4.0 | 50 | 76 |
| 11 | Triflic Acid[e] (0.05) | 0.25 | 62 | 70 |
| | | 2.0 | 58 | 72 |
| B | None | 0 | 209 | 0 |
| | | 2.0 | 208 | 0.5 |
| | | 9.5 | 202 | 3 |
| C | Sulfuric Acid (0.5) | 1.0 | 177 | 15 |
| D | Concentrated Hydrochloric Acid[c] (0.5) | 1.0 | 209 | 0 |
| E | CH$_3$SO$_3$H[d] (0.5) | 1.0 | 192 | 8 |

[a] A 48 weight percent solution in water.
[b] A 60 weight percent solution in water.
[c] A 37 weight percent solution in water.
[d] A 70 weight percent solution in water.
[e] Trifluoromethanesulfonic acid.

EXAMPLE 12

Into a 25 mm×200 mm test tube having a magnetic stirring bar and sealed with a serum cap was added 5.72 grams (0.0397 moles) of ethyl hydrogen fumarate (commercially available from the Aldrich Chemical Company, Milwaukee, Wis.) and 3.63 grams (0.0394 moles) of bicyclo[2.2.1]hepta-2,5-diene (commercially available from the Aldrich Chemical Company, Milwaukee, Wis.). After heating the reaction mixture to a temperature of 120° C. with continuous stirring, 32 milliliters (0.5 weight percent) of fluoroboric acid (a 48 weight percent solution in water) were added into the test tube. The resulting reaction mixture was maintained at a temperature of 120° C. for a period of one hour with continuous stirring. The extent of the reaction between ethyl hydrogen fumarate and bicyclo[2.2.1]hepta-2,5-diene was monitored during this period by titration for residual acid. A sample was removed from the test tube after the one hour reaction period and analyzed to determine the acid number thereof. Based on the initial acid number of the reaction mixture, an 86 percent decrease in acid number was observed after the one hour reaction period.

EXAMPLE 13

Into a 25 mm×200 mm test tube having a magnetic stirring bar and sealed with a serum cap was added 5.0 grams (0.0347 moles) of ethyl hydrogen fumarate (commercially available from the Aldrich Chemical Company, Milwaukee, Wis.) and 3.74 grams (0.40 moles) of bicyclo[2.2.1]-2-heptene (commercially available from the Aldrich Chemical Company, Milwaukee, Wis.). After heating the reaction mixture to a temperature of 120° C. with continuous stirring, 32 milliliters (0.5 weight percent) of fluoroboric acid (a 48 weight percent solution in water) were added into the test tube. The resulting reaction mixture was maintained at a temperature of 120° C. for a period of 3 hours with continuous stirring. The extent of the reaction between ethyl hydrogen fumarate and bicyclo [2.2.1]-2-heptene was monitored during this period by titration for residual acid. A sample was removed from the test tube after the 3 hour reaction period and analyzed to determine the acid number thereof. Based on the initial acid number of the reaction mixture, a 68 percent decrease in acid number was observed after the 3 hour reaction period.

Examples 14 through 21 describe SPI gel time experiments using the procedure described by A. L. Smith (6th SPI, Chicago, Ill., 1951, Reinforced Plastics Div., Section 1, page 1).

EXAMPLES 14 THROUGH 21

Into a small glass jar was added 20 grams of a resin specified for each example in Table C and 1 phr of benzoyl peroxide initiator. The resulting mixture was stirred for 5 minutes and then poured into a 19 mm×150 mm test tube to a depth of 3 inches. A thermocouple was placed into the center of the mixture, and the test tube was then immersed in an oil bath at 82.3° C. The cure speed for each resin is reflected by the gel time and by the total time to peak temperature. The gel time is the time required for the temperature of the mixture to rise from 65.5° C. to 87.8° C. The total time is the time required for the temperature of the mixture to rise from 65.5° C. to the peak temperature. The peak temperature is the maximum temperature achieved during cure. The gel time, total time and peak temperature are given for each of the examples in Table C. The styrene content of each resin is also given in Table C. The cured plug obtained from each of the examples was hard and clear. For some examples, additional monomer was added to produce the compositions shown in Table C.

TABLE D-continued

|  | Example | | |
|---|---|---|---|
|  | 22 | 23 | 24 |
| Flexural Modulus ($10^5$ psi) | 5.1 | 6.4 | 5.1 |
| Heat Deflection Temperature (°C.) | 158 | 157 | 147 |
| Barcol Hardness | 45 | 44 | 45 |

Examples 25 through 28 describe the preparation of fiber reinforced composites from the resin compositions of this invention.

EXAMPLES 25 THROUGH 28

Into a 10 inch×5½ inch×1/10 inch constant volume mold preheated to a temperature specified for each example in Table E was injected a thermosetting resin mixture containing a portion of the resin specified for each example in Table E, an amount of Zelec UN mold release agent which is an organophosphate mold release commercially available from E. I. duPont de Nemours, Wilmington, Del., and an amount of t-butyl perbenzoate initiator. The resin mixture employed in Example 26 also contained an amount of 2-hydroxyethyl methacrylate specified in Table E. Approximately 85 grams (5 plies) of AKM random glass mat commercially available from PPG Industries, Inc., Pittsburgh, Pa., was placed in the 10 inch×5½ inch×1/10 inch constant volume mold prior to injection. The mold was then closed and evacuated for about 5 seconds prior to injection of the particular resin mixture. The injection time for each of the examples is specified in Table E. An injection pressure of 250 pounds per square inch was maintained for a dwell period of 5 seconds for each

TABLE C

|  | Example | | | | | | | |
|---|---|---|---|---|---|---|---|---|
|  | 14 | 15 | 16 | 17 | 18 | 19 | 20 | 21 |
| Resin Prepared from Example # | 1 | 1 | 2 | 3 | 4 | 5 | 6 | 7 |
| Styrene Content of Resin (wt. %) | 31.2 | 25.[a] | 45 | 40 | 40 | 40 | 40 | 25 |
| Gel Time (min.) | 13.8 | 11.2 | 13.9 | 15.0 | 4.7 | 4.2 | 6.0 | 6.3 |
| Total Time (min.) | 16.5 | 13.9 | 17.1 | 17.5 | 7.0 | 6.3 | 8.8 | 9.6 |
| Peak Temperature (°C.) | 193 | 196 | 211 | 201 | 232 | 233 | 219 | 194 |

[a] Resin composition: 55 weight percent polyester, 25 weight percent styrene, 20 weight percent hydroxyethyl methacrylate.

Examples 22 through 24 describe the preparation of unreinforced castings from the resin compositions of this invention.

EXAMPLES 22 THROUGH 24

Into an 8 inch×8 inch×⅛ inch glass mold was poured a thermosetting resin mixture containing 140 grams of a resin specified for each example in Table D, 0.7 grams of Zelec UN mold release which is an organophosphate mold release agent commercially available from E. I. duPont de Nemours, Wilmington, Del., and 1.4 grams of t-butyl perbenzoate initiator. The thermosetting resin mixture was then heated using a programmed temperature cycle, i.e., 16 hours at 65° C., 3 hours at 85° C. and 4 hours at 125° C. The castings obtained from each of the examples were hard and clear. The castings were tested for certain properties identified in Table D and the results of such testing are given in Table D.

example. The resin penetrated the glass web and wet the fibers before it formed a thermoset composition. Following the cure time specified for each example, the resulting cured glass reinforced composites were removed from the mold and tested for certain properties identified in Table E. The results of such testing are given in Table E.

TABLE E

|  | Example | | | |
|---|---|---|---|---|
|  | 25 | 26 | 27 | 28 |
| Resin Mixture Composition |  |  |  |  |
| Resin Prepared from Example # | 1 | 1 | 2 | 3 |
| Resin (gms) | 700[a] | 800 | 600 | 500[c] |
| Zelec UN Mold Release (gms) | 3.5 | 5.0 | 3.0 | 3.0 |
| t-Butyl Perbenzoate (gms) | 10.5 | 15.0 | 9.0 | 9.0 |
| 2-Hydroxyethyl Methacrylate (gms) | — | 200 | — | — |
| Molding Conditions |  |  |  |  |
| Mold Temperature (°C.) | 140 | 144 | 140 | 135 |
| Injection Time (sec.) | 4 | 7 | 7 | 14 |
| Cure Time (sec.) | 70 | 60 | 80 | 75 |
| Total Mold Closed Time[b] (sec.) | 84 | 77 | 97 | 99 |
| Composite Properties |  |  |  |  |
| Tensile Strength ($10^3$ psi) | 23.9 | 34.0 | 24.6 | 21.7 |

TABLE D

|  | Example | | |
|---|---|---|---|
|  | 22 | 23 | 24 |
| Resin Prepared from Example # | 2 | 3 | 7 |
| Casting Properties |  |  |  |
| Flexural Strength ($10^3$ psi) | 2.5 | 5.0 | 14.8 |

TABLE E-continued

|  | Example | | | |
| --- | --- | --- | --- | --- |
|  | 25 | 26 | 27 | 28 |
| Tensile Modulus ($10^6$ psi) | 1.51 | 1.98 | 1.53 | 1.25 |
| Elongation (%) | 1.8 | 2.0 | 2.0 | 2.3 |
| Flexural Strength ($10^3$ psi) | 24.2 | 39.5 | 25.7 | 33.3 |
| Flexural Modulus ($10^6$ psi) | 1.20 | 2.05 | 1.49 | 1.70 |
| Glass Content (wt. %) | 54 | 62 | 54 | 52 |

[a] 640 grams of the resin prepared from Example 1 was blended with 160 grams of styrene. A 700 gram portion of this mixture was used in the preparation of a fiber reinforced composite.
[b] The total mold closed time includes the sum of the evacuation time (5 seconds for each example), the injection time, the dwell time (5 seconds for each example) and the cure time.
[c] An additional 50 grams of styrene was added to this resin mixture.

As illustrated by Examples 25 through 28, fiber reinforced thermoset resin articles having high stiffness and strength can be produced from the curable resin compositions of this invention by a rapid injection molding process.

COMPARATIVE EXAMPLE F

Into a 3 liter four-necked round bottom reaction flask equipped with a nitrogen inlet and outlet, paddle stirrer, electric heating mantle, thermometer with Therm-O-Watch controller and a 12 inch packed distillation column and distillate receiver was added 588 grams (6.0 moles) of molten maleic anhydride and 290 grams (4.68 moles) of ethylene glycol. The resulting reaction mixture was heated to a temperature of 90° C. over a one hour period with continuous stirring. When the temperature reached 55° C., 75.6 milliliters (4.2 moles) of water was added to the reaction flask. The reaction mixture was maintained at a temperature of 90° C. for a period of one hour, after which 475 grams (3.6 moles) of resin grade dicyclopentadiene (commercially available from Dow Chemical Company, Midland, Mich. as XAS 1348) was added to the reaction flask over a 12 minute period. The reaction mixture was then heated to a temperature of 121° C. to 125° C. and maintained at this temperature for a period of 3 hours. At the end of this period, the reaction mixture was further heated to a temperature of 200° C. over a period of one hour, and maintained at a temperature of 198° C. to 220° C. for a period of 8.5 hours as water was removed overhead. A nitrogen blanket was maintained throughout the entire reaction period. At the end of this period, the reaction mixture gelled. The product was unsuitable for use as a resin.

COMPARATIVE EXAMPLE G

The procedure described in Comparative Example F was repeated with the exception that 0.5 milliliters of tributylphosphite was added to the reaction mixture. Tributylphosphite is a potential hydroperoxide decomposer. This reaction mixture was heated to a temperature of 199° C. to 201° C. and maintained at this temperature for a period of 3.4 hours. At the end of this period, the reaction mixture gelled. The product was unsuitable for use as a resin.

I claim:

1. A process for preparing a resin composition comprising the steps of:
   (a) contacting a molar excess of an alpha, beta unsaturated dicarboxylic acid or derivative thereof with an organic polyol for a time and at a temperature sufficient to form a composition comprising a carboxylic acid terminated polyester having the formula:

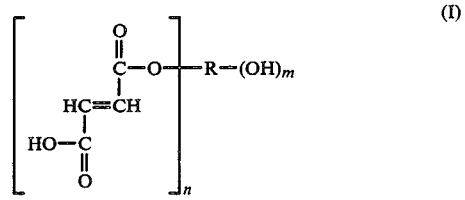

wherein n is a number having an average value of about 2 to less than about 4, m is a number equal to the free valence of R less the average value of n, the ratio of n to m is greater than about 2.0, and R is the residuum of a polyester which contained from 2 to 4 inclusive hydroxyl groups;
   (b) contacting a Diels-Alder adduct of cyclopentadiene with an olefinic or acetylenic hydrocarbon or alkylated derivative thereof with the carboxylic acid terminated polyester of (a) in the presence of a non-oxidizing acid catalyst having a non-nucleophilic anion for a time and at a temperature sufficient to form a composition comprising an unsaturated ester having the formula:

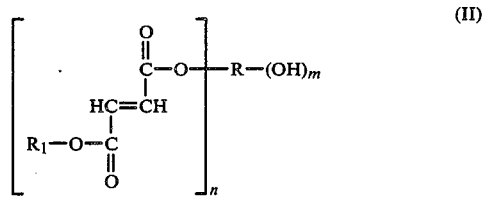

wherein n, m and R are as defined above and $R_1$ is the residuum of a Diels-Alder adduct of cyclopentadiene with an olefinic or acetylenic hydrocarbon or alkylated derivative thereof having from 2 to about 20 carbon atoms; and
   (c) admixing a copolymerizable ethylenically unsaturated monomer with the unsaturated ester of (b).

2. A process as defined in claim 1 wherein the alpha, beta unsaturated dicarboxylic acid or derivative thereof in step (a) is selected from maleic acid or anhydride and fumaric acid.

3. A process as defined in claim 1 wherein the alpha, beta unsaturated dicarboxylic acid or derivative thereof in step (a) is present in a molar excess amount of between 5 and 60 percent.

4. A process as defined in claim 1 wherein the organic polyol in step (a) is selected from ethylene glycol, diethylene glycol, propylene glycol, trimethylol propane, polycaprolactone esters of trimethylol propane or 1,4-butanediol, 2,2-bis(4-hydroxyphenyl) propane, and the ethylene and propylene oxide adducts of 2,2-bis(4-hydroxyphenyl) propane.

5. A process as defined in claim 1 wherein step (a) is carried out at a temperature of from 170° C. to 220° C.

6. A process as defined in claim 1 wherein the carboxylic acid terminated polyester of formula (I) and the unsaturated ester of formula (II) have a ratio of n to m of at least about 3.0.

7. A process as defined in claim 1 wherein step (b) is carried out at a temperature of from 80° C. to 140° C.

8. A process of defined in claim 1 wherein the Diels-Alder adduct of cyclopentadiene with an olefinic or acetylenic hydrocarbon or alkylated derivative thereof in step (b) is selected from dicyclopentadiene, norbornene and norbornadiene.

9. A process as defined in claim 1 wherein the Diels-Alder adduct of cyclopentadiene with an olefinic or acetylenic hydrocarbon or alkylated derivative thereof in step (b) is dicyclopentadiene.

10. A process as defined in claim 1 wherein the non-oxidizing acid catalyst having a non-nucleophilic anion in step (b) is selected from fluoroboric acid, hexafluorophosphoric acid, hexafluoroantimonic acid and trifluoromethanesulfonic acid (triflic acid).

11. A process as defined in claim 1 wherein the non-oxidizing acid catalyst having a non-nucleophilic anion in step (b) is fluoroboric acid.

12. A process as defined in claim 1 wherein the non-oxidizing acid catalyst having a non-nucleophilic anion in step (b) is present in an amount of from 0.01 weight percent to 4.0 weight percent based on the weight of the unsaturated ester of step (b).

13. A process as defined in claim 1 wherein the copolymerizable ethylenically unsaturated monomer in step (c) is styrene.

14. A process as defined in claim 1 wherein the copolymerizable ethylenically unsaturated monomer in step (c) is a mixture of styrene and 2-hydroxyethyl methacrylate.

15. A process as defined in claim 1 wherein the copolymerizable ethylenically unsaturated monomer in step (c) is present in an amount of from 10 weight percent to 75 weight percent based on the weight of the resin composition.

16. A process as defined in claim 1 further comprising treating the resin composition with a weak base.

17. A process as defined in claim 16 wherein the weak base is selected from crosslinked polyvinylpyridine, disodium acid phosphate, sodium carbonate and alumina.

18. A resin composition prepared according to the process of claim 1.

19. A cured molded article prepared from the resin composition of claim 18.

20. A cured molded article prepared from the resin composition of claim 18 wherein the molded article contains one or more fibers with a melting point or a glass transition temperature above about 130° C.

* * * * *